United States Patent [19]
Buehler et al.

[11] 3,798,646
[45] Mar. 19, 1974

[54] CONTINUOUS-WAVE, MULTIPLE BEAM AIRPLANE LANDING SYSTEM

[75] Inventors: Walter Erwin Buehler, Issaquah; Clarence David Lunden, Tacoma, both of Wash.

[73] Assignee: The Boeing Company, Seattle, Wash.

[22] Filed: Sept. 7, 1971

[21] Appl. No.: 178,003

[52] U.S. Cl............... 343/109, 343/703, 343/779, 343/854
[51] Int. Cl............................................. G01s 1/14
[58] Field of Search........ 343/109, 107, 17.7, 16 M, 343/703, 835, 813, 775, 786, 854; 321/69 W, 69 NL

[56] References Cited
UNITED STATES PATENTS

| | | | |
|---|---|---|---|
| 3,210,390 | 1/1973 | Kreinheder | 343/16 M |
| 3,281,647 | 10/1966 | Hines et al. | 321/69 M |
| 3,593,155 | 7/1971 | Lowe et al. | 321/69 M |
| 2,540,839 | 2/1951 | Southworth | 343/786 X |
| 2,537,995 | 3/1952 | Griggs | 343/109 X |
| 3,422,427 | 1/1969 | Schauffler | 343/109 |
| 2,476,301 | 7/1949 | Jenks | 343/109 |
| 3,221,328 | 11/1965 | Isch | 343/16 M |
| 3,164,835 | 1/1965 | Alsberg | 343/17.7 |

OTHER PUBLICATIONS
"Varactor Handbook", Sylvania, Aug. 1967, pages 11-13

Primary Examiner—Benjamin A. Borchelt
Assistant Examiner—S. C. Buczinski
Attorney, Agent, or Firm—Christensen, O'Connor, Garrison & Havelka

[57] ABSTRACT

A microwave landing system for airplanes is disclosed in which continuous wave energy from a common source is radiated in overlapping beams which are modulated at respectively different audio frequencies detectable by an airplane receiver which detects the separate modulations and indicates relative offset from the overlap axis of the beams by relative levels of the demodulated signals. Modulation of the beams is effected by solid state semi-conductor devices placed in resonant cavities in wave guide system branches in the radiator element feeds. Radiator elements forming the beams comprise rectangular wave guide endings serving as highly compact closely spaced horns directed against a common paraboloidal reflector, with the narrow walls of the wave guides terminating in a common transverse plane and the broad walls terminating in flared triangular extensions beyond such plane. Monitoring of the transmitted beams for the presence and relative energy levels of the modulated beams is achieved by a microwave aperture located at the apex of the paraboloidal reflector and feeding a modulation detector and associated alarm indicator or control means.

8 Claims, 5 Drawing Figures

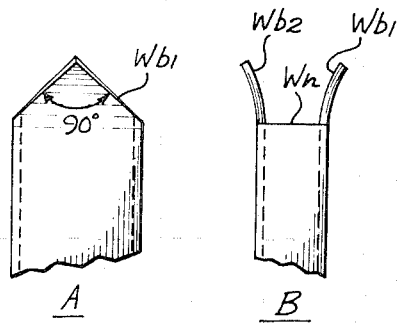
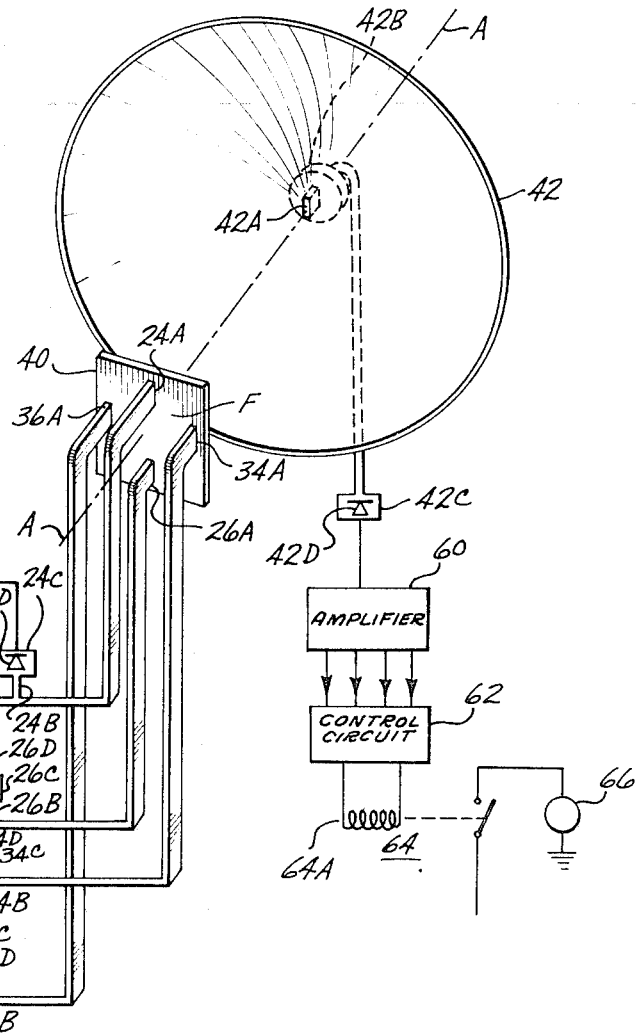
Fig. 4
Fig. 2

CONTINUOUS-WAVE, MULTIPLE BEAM AIRPLANE LANDING SYSTEM

BACKGROUND OF THE INVENTION

This invention relates to improvements in microwave airplane instrument landing system technology and more especially concerns an improved low-cost and relatively simple instrument landing system. The invention is herein illustratively described by reference to the presently preferred embodiment thereof; however, it will be recognized that certain modifications and changes therein with respect to details may be made without departing from the essential features involved.

The existing need for a low-cost versatile and reliable microwave landing system throughout the world is evidenced in part by the relatively small percentage of air fields served by commercial airlines which have instrument landing systems (ILS) enabling airplanes to land under conditions of limited visibility and by the fact that many air fields which do have instrument landing systems usually permit instrument landings in one direction only, namely in the predominate bad weather direction. It is, therefore, desirable to provide a guidance system having a relatively compact and inexpensive transmitter apparatus for each end of a main runway or a mobile apparatus of this nature that can be shifted from one end of a field to the other when weather conditions so indicate.

Moreover, existing types of instrument landing systems, operating in the one to three meter wavelength range, usually require a large amount of land adjacent the landing field proper in order to prevent the erection of buildings or to control building placement and surface contours so as to avoid interference with beam patterns. Most existing ILS systems suffer from some interference effects with the result that their ILS courses are scalloped producing undesirable transients in automatic pilot controlled approaches, and undesirably large dispersion of touchdown points.

A general object of this invention is to devise a multilobe instrument landing system which overcomes the above limitations and difficulties.

Another object of this invention is to devise a microwave instrument landing system sufficiently simple, inexpensive and compact to be usable on small landing fields having limited funds and space for equipment. A related object is to provide a reliably precise, readily maintained, self-monitoring and interference-free multi-beam instrument landing system. Portability is also a purpose of this invention.

Still another object hereof is to provide a microwave instrument landing system which is sufficiently low in its transmitter profile as to permit safe installation thereof above ground level ahead of the runway threshold and along the runway center line so as to eliminate the problem of parallax and to provide both vertical and lateral guidance signals to incoming aircraft.

Still another object hereof is to devise an instrument landing system requiring simple and reliable aircraft receiver apparatus suitable for compact, light-weight construction.

In accordance with this invention overlapping modulated CW microwave beams are projected from a ground based antenna located at or near the touchdown point or threshold of the runway and preferably having four feeds arranged in pairs closely grouped about the focus of a parabolic antenna reflector. One feed pair is arranged in a horizontal plane transverse to the runway to provide lateral guidance (localizer) lobes which overlap at partial power points symmetrically arranged in relation to the paraboloid axis and the other pair is similarly arranged to provide vertical (guide slope) guidance. Solid state semi-conductor diodes, arranged in the wave guide means which divide the energy from a common CW energy source between the four antenna feed elements, serve as modulating elements. Modulation signals at four discrete audio frequencies applied to the respective diodes vary the impedance of these diodes and thereby modulate (by amplitude) the CW energy level emitted from the wave guide antenna feed elements.

A monitoring aperture at the vertex of the paraboloid reflector picks up energy in equal proportions from the four wave guide feed emissions and after detection and filtering of the respective modulation signals therefrom enables a maintenance technician to observe and adjust the desired energy level balance in the four beams, or for a simple threshold circuit to signal an unbalance and to automatically take the system off the air in the event of an unbalance.

A receiver means aboard the airplane detects the incoming microwave energy and provides a demodulated output containing the respective modulation frequencies of the beams. These frequencies are separated in filters, while maintaining their relative amplitudes, and utilized to operate a cross-pointer type instrument landing indicator on the basis of relative energy levels of the respective detected modulation signals from opposing beams.

Preferably the microwave wave guide means feeding energy to the reflector to produce the four orthogonally related beams comprises in each feed a branch wherein the variable impedance solid state device is mounted. The feed elements per se which are directed against the reflector comprise rectangular wave guide termini serving as highly compact horns which can be grouped very closely together as desired without incurring objectionable beam cross-talk. Each such wave guide terminus has its narrow walls terminate in a common transverse plane and its broad walls extend beyond that plane to terminate in isosceles triangular extensions which flare progressively toward their tips so as to increase the gain to any desired degree.

This and other features, objects and advantages of the invention will become fully evident from the following description with reference to the accompanying drawings.

DRAWINGS

FIG. 2 is a schematic diagram of the transmitter used in the system.

FIG. 4a is a face view (i.e., perpendicular to a broad side) and FIG. 4b is a side view of a wave guide terminal radiator element for directing energy against the transmitter paraboloid reflector.

DETAILED DESCRIPTION OF THE INVENTION

Figure 1:
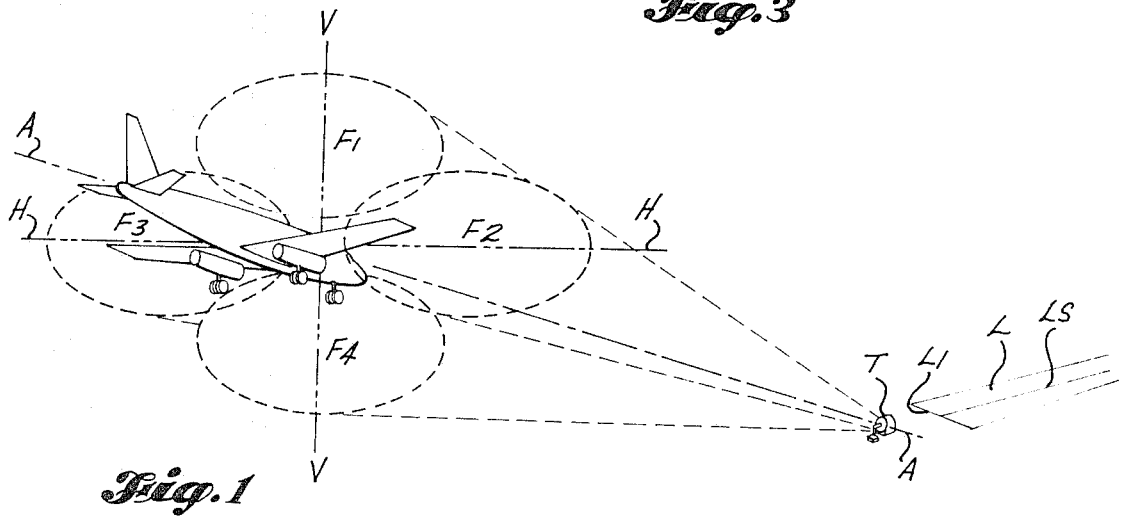
FIG. 1 is a diagrammatic illustration of the landing system beam pattern and runway relationship for guiding an airplane, the arrangement being generally typical of former lobe switching type systems.

As shown in FIG. 1, the transmitter T is typically positioned a short distance ahead of the landing field runway threshold $L_1$ and in line with the center line $L_s$ of the runway L. The transmitter T produces four similar CW microwave energy beams grouped symmetrically about a desired glide path A—A representing the optimum approach path to the runway L. Two of the beams $F_1$ and $F_4$ are in vertical alignment along a plane V—V containing the axis A and the remaining two beams $F_3$ and $F_2$ are in a horizontal plane H—H containing the axis A. The beams $F_1$ and $F_4$ overlap each other at corresponding partial power points below peak beam intensity on the central axis of each beam, and the same is true of beams $F_3$ and $F_2$, respectively.

The function of the transmitter T, therefore, is to produce the two pairs of overlapping antenna pattern lobes or beams with each pair preferably at the same microwave energy frequency, and more specifically from the same microwave CW energy source. However, the continuous wave energy in each of the patterns $F_1$, $F_2$, $F_3$ and $F_4$ is modulated, the modulation frequency being different in and characteristic of each of the four beams, the modulation amplitude being substantially equal in opposing lobes, and the microwave carrier amplitude being approximately equal in the opposing lobes. The modulation frequencies used are preferably in the audio frequency range and so chosen as to minimize any likelihood of multiples or harmonics from one beam producing interference with the detection and separation of fundamental modulation frequency signals in the other beams of the array. Thus, the energy in beam $F_4$ may be modulated, for example, at a frequency of 114 Hz, that in beam $F_1$ at 70 Hz, that in beam $F_3$ at 150 Hz, and that in beam $F_2$ at 90 Hz. An airplane flying down the directional axis A—A will then receive modulated microwave energy with equal modulation amplitudes from opposing beams in both horizontal and vertical planes. If the airplane's flight position should stray upwardly from the axis A its guidance receiver will receive relatively more modulation envelope amplitude from the beam $F_1$ and less from the beam $F_4$. The detected relative amplitudes of the modulation signals in these opposing continuous wave energy beams are then used to indicate the deviation from flight path on a suitable indicator device. Deviations to the right or left or below the guide path are presented to the pilot in a simlar manner.

In reference to FIG. 2, the illustrative apparatus comprises a common microwave energy source 10 such as a 10,000 megahertz oscillator (three centimeter wavelength) feeding energy through a wave guide 12 to a junction 14 from which wave guides 16 and 18 branch to divide the energy equally from the source 10. Associated with the junction 14 is a suitable impedance matching device shown schematically at 20, minimizing reflections from the junction back to the source. Similarly, energy transmitted through wave guide 16 encounters a junction 2 in which the energy again divides equally into wave guides 24 and 26 with impedance matching means 28 at the junction 22 in order to minimize energy reflections from that junction back into the wave guide 16. In like manner, energy flowing through the guide 18 encounters a junction 30 with an impedance matching element 32, at which junction the energy is divided equally into the wave guides 34 and 36 respectively. By such a means continuous wave energy from source 10 is divided into four equal parts for delivery through the wave guides 24, 26, 34 and 36 respectively to radiator elements 24a, 26a, 34a and 36a respectively.

These radiator elements comprise rectangular wave guide terminations mounted by suitable means illustrated as supported physically by a dielectric plate 40 in a cluster closely grouped about the focal point F of the parabolic dish reflector 42. Focal point F is located on the reflector axis A—A and the upper and lower radiators 24a and 26a are located closely above and closely below the axis A whereas the right and left side radiators 36a and 34a respectively are similarly located closely together adjacent opposite sides of the axis A, in a symmetrical relationship. By thus closely grouping the terminal or radiation ends of the four rectangular wave guides, with their E planes in parallel relationship, and directing these radiations toward the antenna relfector 42, four slightly "squinted" overlapping beams $F_1$, $F_2$, $F_3$ and $F_4$ are produced as depicted in FIG. 1. As already indicated, the beams all have the same direction of polarization (i.e., horizontal in the example) and even though the wave guide radiator elements are located very closely together they are formed in a manner to be described so as to minimize the amount of cross-talk between the resultant beams, i.e., appreciable energy from one beam appearing in the space intended to be occupied by the opposing beam. 1

As shown in FIG. 4a, a face view of the wave guide terminal configuration, it will be seen that the broad sides of the guide comprise an isosceles triangle having a noncritical apex angle which may, for example, be 90° as shown in FIG. 4a, projecting beyond the terminal edges of the narrow sides of the guide which, as shown in FIG. 4b, terminate in a common transverse plane. Preferably also the projecting broad faces or walls $Wb_1$ and $Wb_2$ are both curved to flare outwardly toward their extremities in a curve such as a circular arc, this flare increasing the directivity of the guide as a radiator element. The narrow wall end edges Wn terminating in a common transverse plane would have little effect on the radiation pattern from the guide even if extended beyond the base ends of the triangular broad wall extensions, so are conveniently terminated at the described location. With such a wave guide terminal form serving as the radiator element, it is found that the wave guides may be placed very closely together in order to achieve the very small angle of separation between the associated beam pairs. In the drawing, the wave guides are shown spaced farther apart than they are in practice, for convenience in illustration only.

Moreover, it is found that if just one broad wall of the wave guide endings is curved to produce the gain-increasing flare, cross-talk between beams is the result. By flaring both broad walls to their outer extremities approximately 25 decibels isolation is achieved between opposing beams. Typically the spread between the end extremities of the wall extensions $Wb_1$ and $Wb_2$ is approximately one electrical wavelength, the wave guide E-plane height being itself less than a quarter-wavelength.

It will be appreciated that the energy beams produced by a paraboloid reflector 42 from each of these radiant energy sources may each be highly directional, i.e., of the order of two degrees beam width at the half-power points of each beam, and for a 3 centimeter system the paraboloid can still be relatively small in physical diameter, such as of the order of 4 feet across. If desired the reflector need not be circular but can be elliptical or some other shape depending on the beam shape desired.

In order to modulate the continuous-wave energy being radiated from the wave guide terminus 24A against the reflector 42, the wave guide 24 has a branch 24B located intermediate its ends, which branch terminates in a resonant cavity 24C wherein is mounted a variable-impedance, solid state semi-conductor device, such as diode 24D, so placed in the resonant cavity as to be spaced a distance equivalent to a whole number of electrical half-wavelengths from the junction between the branch 24B and the main wave guide 24. Similar branches with resonant cavities and semi-conductor solid state diodes are correspondingly associated with the wave guides 26, 34 and 36 and the parts bear corresponding reference designations. Diode 24D is connected electrically to a source of audio frequency current, 50, of 114 Hz and of an impedance or resistance of the diode 24D through a range which will react upon the incident microwave energy to reflect a varying degree of mismatch back to the junction between guides 24B and 24. This, in turn, varies the electrical impedance mismatch presented to the wave guide 24 leading to the junction 22 from the source and will thereby vary the amount of microwave energy which reaches the radiator element 24A to form the associated beam. Similarly diodes 26D, 34D and 36D are electrically connected to be energized by audio frequency energy sources 52, 54 and 56 respectively at frequencies 70 Hz, 150 Hz and 90 Hz to produce similar modulation effects on the associated CW beams produced by radiators 26A, 34A and 36A, respectively. The modulation level is made the same in each of the opposing beams. For this equality to be maintained, it is also desirable, of course, that the microwave energy level incident upon the opposing modulator cavities be approximately equal also, because the impedance level of the diodes is also affected by microwave energy level to which they are subjected. Alternative modulators, which minimize energy reflections and thereby modulation cross-talk between lobes, may also be used if desired.

To be continuously assured that the system is functioning properly and, therefore, that the modulation levels of the opposing pairs of antenna radiator elements are matched, there is provided at the apex of the paraboloid reflector 42 a window or aperture 42A which leads to an output wave guide 42B terminating in a detector 42C. The detector 42C comprises a r-f detector diode element 42D electrically connected to a suitable amplifying unit 60 feeding frequency selective filters tuned to the respective modulation frequencies and connected to a control circuit 62. The control circuit 62 is in turn arranged to energize the coil 64a of the relay 64 in response to an unbalance in the modulation levels detected from either of the opposing beam pair components so as to energize a warning light 66 or operate an appropriate actuation unit which removes the landing system from the air and renders it inoperative so that an airplane is not misguided by false glide path signals which do not accurately define the desired landing approach line.

Figure 3:
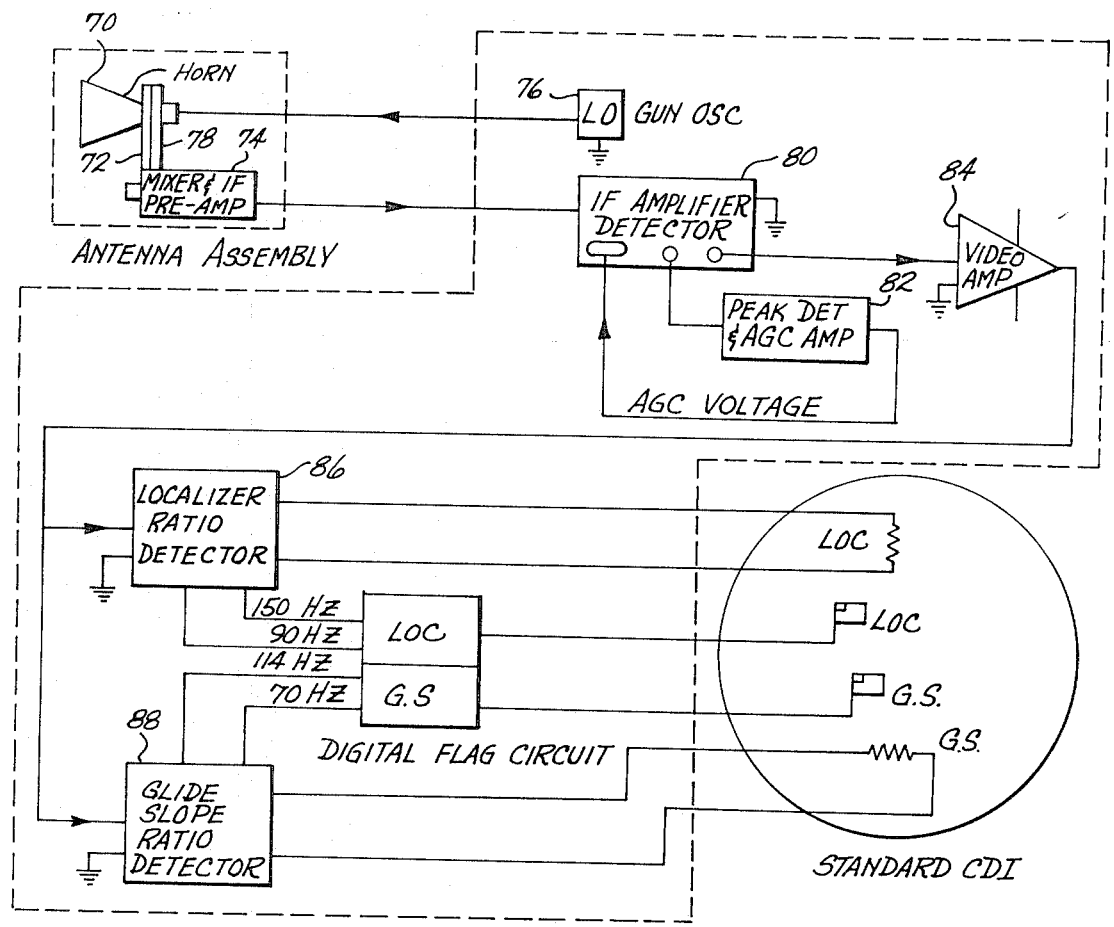
FIG. 3 is a schematic diagram of the system receiver.

As shown in FIG. 3, the airplane receiver unit comprises a small microwave receiving horn 70 leading through a wave guide 72 to a conventional mixer, detector and intermediate frequency preamplifier unit 74. Likewise leading into the unit 74 is energy from a microwave local oscillator 76 and associated wave guide 78, so that the mixer receiving energy from the horn 70 and the local oscillator produces the desired intermediate frequency. The latter, that is the output from the unit 74, is then fed to an intermediate frequency amplifier 80 including in its output a detector for demodulating the intermediate frequency signal energy which continues to carry the audio frequency modulation components picked up in the horn 70. The intermediate frequency amplifier 80 has associated with it a peak detector and automatic gain control amplifier 82 of a conventional nature, which delivers an automatic gain control voltage to one or more of the amplifier stages so as to maintain an overall gain in the intermediate frequency amplifier stages which keeps the output energy level from that unit within a suitable range for delivery in the form of detected or video (modulation envelopes) signals to the video amplifier 84. The video amplifier 84 receives and amplifies the modulation envelope signals thus derived from the respective antenna beams and, after amplification, these are fed to a localizer difference detector 86 and also to a guide-slope difference detector 88. Each of these detectors contains appropriate filters to separate out the associated audio frequencies representing the modulation frequencies used in the system and, by the relative amplitudes thereof, they are used in turn to operate a standard course deviation indicator (CDI) or other suitable indicating or warning device which informs the pilot as to his position in relation to the desired flight path.

It will be recognized by those skilled in radar and allied microwave technology that the illustrative details and the means for producing and utilizing the signals may vary. It will also be appreciated that the advantages of the invention are realized to a maximum extent with both beam pairs produced from a common energy source and by a common reflector antenna.

We claim:

1. A microwave guidance system for landing of airplanes comprising a ground based microwave energy transmitter for producing substantially similar directional beams diverging mutually from and overlapping at corresponding partial power points along an intermediate directional axis which defines a desired landing path, the CW energy in each of said beams being modulated by signals of respectively different relatively low frequencies and of substantially equal amplitude, and an airplane based microwave receiver including means for demodulating the received beam energy signals, discriminating by frequency between the demodulated signals, and indicating by amplitude of such demodulated signals the relative beam energy levels being received, and thereby relative positional offset of the airplane from the landing path, said transmitter comprising a CW microwave energy source, directional antenna means including separate beam-forming radiator elements therein, and means dividing energy from said source and feeding the energy at substantially equal levels to each of said radiator elements, said dividing and feeding means including separate wave guide means each having a variable impedance element arranged therein to modulate the level of microwave source energy being fed thereby to the associated radiator element in accordance with impedance variations of such variable impedance element, and means applying to such variable impedance elements impedance-varying signals of respectively difference relatively low frequencies and of substantially equal amplitudes.

2. The guidance system defined in claim 1, wherein the antenna means comprises a concave paraboloidal reflector and associated beam-forming radiator elements directed against the reflector from respective locations grouped symmetrically about the axis of said reflector adjacent its focal point so as to produce the respective directional beams thereby, and means to monitor the beams including a microwave energy transfer element positioned at the apex of the reflector to extract energy in substantially equal proportions from the emissions of said radiator elements, and means connected with said energy transfer element for demodulating the energy received therefrom and indicating the relative amplitudes of modulation signals therein.

3. The guidance system defined in claim 2, wherein the microwave energy transfer element comprises a slot formed in the apex of the reflector.

4. The guidance system defined in claim 1, wherein the antenna means comprises a concave paraboloidal reflector and associated beam-forming radiator elements directed against the reflector from respective locations grouped symmetrically about the axis of said reflector adjacent its focal point so as to produce the respective directional beams thereby, said radiator elements comprising rectangular wave guide endings with narrow walls coterminal in a common transverse plane and with their broad walls extending substantially equally beyond said plane in symmetrically convergent form.

5. The guidance system defined in claim 4, wherein the extended broad walls of the wave guide endings are relatively flared beyond the said plane.

6. The guidance system defined in claim 1, wherein the separate wave guide means each branch to the associated energy radiator element and to the variable impedance element, the branch containing the variable impedance element terminating in a resonant cavity wherein is mounted the variable impedance element effectively at a location substantially a whole number of electrical half wavelengths from the wave guide branch junction.

7. The guidance system defined in claim 6, wherein the variable impedance element comprises a solid state semiconductor device having electrical connections by which to pass electrical current through said device in order to vary the electrical current through said device in order to vary the electrical impedance thereof.

8. In an airplane instrument guidance system using overlapping antenna pattern directional beams, means for forming of such beams comprising a common source of microwave CW energy, a pair of radiators connected to be energized at substantially equal energy levels from said source, beam pattern forming means associated with said radiators, means including separate varible impedance elements in the respective connections between said source and radiators, and means to apply impedance-changing modulation signals of different relatively low frequencies to said elements of substantially equal amplitudes thereby to vary the CW energy envelopes at the respective modulation frequencies emitted from said radiators.

* * * * *

PO-1050
(5/69)

UNITED STATES PATENT OFFICE
CERTIFICATE OF CORRECTION

Patent No. 3,798,646     Dated March 19, 1974

Inventor(s) Walter Erwin Buehler et al

It is certified that error appears in the above-identified patent and that said Letters Patent are hereby corrected as shown below:

Column 7, line 1, delete the word "difference" and substitute therefor the word --different--.

Signed and sealed this 2nd day of July 1974, (SEAL)
Attest:

EDWARD M. FLETCHER,JR.     C.MARSHALL DANN
Attesting Officer          Commissioner of Patents